US012650194B2

(12) United States Patent
Zhang

(10) Patent No.: US 12,650,194 B2
(45) Date of Patent: Jun. 9, 2026

(54) QUICK CONNECTOR STRUCTURE

(71) Applicant: Shenzhen Liquid Cooling Technology Co., Ltd., Shenzhen City (CN)

(72) Inventor: Zhenmin Zhang, Shenzhen City (CN)

(73) Assignee: SHENZHEN LIQUID COOLING TECHNOLOGY CO., LTD., Shenzhen City (CN)

( * ) Notice: Subject to any disclaimer, the term of this patent is extended or adjusted under 35 U.S.C. 154(b) by 18 days.

(21) Appl. No.: 18/988,904

(22) Filed: Dec. 20, 2024

(65) Prior Publication Data

US 2026/0022791 A1     Jan. 22, 2026

(30) Foreign Application Priority Data

Jul. 19, 2024    (CN) .......................... 202421719169.8

(51) Int. Cl.
    *F16L 37/34*        (2006.01)
    *F16L 37/23*        (2006.01)
    *F16L 37/32*        (2006.01)
(52) U.S. Cl.
    CPC .............. *F16L 37/34* (2013.01); *F16L 37/23* (2013.01); *F16L 37/32* (2013.01)
(58) Field of Classification Search
    CPC ............ F16L 37/23; F16L 37/32; F16L 37/34
    See application file for complete search history.

(56) References Cited

U.S. PATENT DOCUMENTS

| | | | | |
|---|---|---|---|---|
| 4,896,697 A | * | 1/1990 | Stromdahl .............. | F16L 37/34 |
| | | | | 137/614 |
| 7,213,845 B2 | * | 5/2007 | Sato ......................... | F16L 37/34 |
| | | | | 285/85 |
| 9,032,997 B2 | * | 5/2015 | Abura ...................... | F16L 37/28 |
| | | | | 251/149.6 |

FOREIGN PATENT DOCUMENTS

| | | | | | |
|---|---|---|---|---|---|
| CN | 113446449 A | * | 9/2021 | .............. | F16L 37/32 |
| GB | 2339874 A | * | 2/2000 | .............. | F16L 37/34 |

OTHER PUBLICATIONS

Machine English translation of CN-113446449-A (Year: 2026).*

* cited by examiner

*Primary Examiner* — Hailey K. Do
(74) *Attorney, Agent, or Firm* — Leong C. Lei

(57)     ABSTRACT

A quick connector structure includes a female connector assembly and a male connector assembly. The female connector assembly includes a female connector, an inner fixed sleeve, an outer movable sleeve, a fixed mandrel, an annular movable plug, a steel ball, a first spring, and a second spring. An annular boss is provided on the inner wall of the inner fixed sleeve. The outer surface of the annular movable plug is a three-section outer surface, and the inner surface of the annular movable plug is a three-section inner surface, such that the female connector assembly and the male connector assembly can be plugged and unplugged with ease and have a better guiding and positioning effect after being connected.

9 Claims, 10 Drawing Sheets

QUICK CONNECTOR STRUCTURE

BACKGROUND OF THE INVENTION

1. Field of the Invention

The present invention relates to a quick connector structure, and more particularly to a quick connector structure having an improved female connector assembly.

2. Description of the Prior Art

A quick connector is a device to realize quick disconnection or connection of pipeline, which is mainly used as a liquid quick connector and can be used as a gas quick connector. The specification of universal quick disconnect (UQD), Revision 1.0, standardizes the shape and size of UQD quick connectors, as shown in FIG. 10.

There are different structural designs for UQD connectors on the market. For example, Chinese Patent Publication No. CN 216692618 U discloses a locking mechanism of a quick connector structure, including a female connector and a male connector. The female connector includes a female valve body having a first flow passage. The female valve body has two inclined grooves running through the peripheral wall of the female valve body in the direction of the wall thickness of the female valve body. A locking pin is provided in each inclined groove. The middle portion of the locking pin is located in the female valve body. An unlocking ring is sleeved on the female valve body. An annular chamber is defined between the unlocking ring and the female valve body. The annular chamber communicates with the inclined grooves. A pressing ring is provided in the annular chamber. The pressing ring is connected to the unlocking ring. A pressing spring is connected to one end of the pressing ring, opposite to the locking pin. Both ends of the locking pin extend into the annular chamber and are in close contact with the end face of the pressing ring. The male connector includes a male valve body having a second flow passage. An annular locking boss is provided on the male valve body. The annular locking boss can be locked in place in conjunction with the locking pin. The annular locking boss has a first inclined surface acting on the middle portion of the locking pin. However, its plugging reliability is not very ideal.

SUMMARY OF THE INVENTION

In view of the deficiencies of the prior art, the primary object of the present invention is to provide a quick connector structure having an improved female connector assembly. In particular, the three-section outer surface, three-section inner surface and related structural design of an annular movable plug ensure a good guiding and positioning effect when the female connector assembly and the male connector assembly are plugged and unplugged, and are less prone to loosening and leakage. The reliability of the combination of the female connector assembly and the male connector assembly can be effectively improved, thereby enhancing the competitiveness of the products.

In order to achieve the above object, the present invention adopts the following technical solutions:

A quick connector structure comprises a female connector assembly and a male connector assembly that are detachably connected to each other.

The female connector assembly includes a female connector, an inner fixed sleeve, an outer movable sleeve, a fixed mandrel, an annular movable plug, a steel ball, a first spring, and a second spring. The inner fixed sleeve extends into one end of the female connector. An inner wall of the inner fixed sleeve has an annular boss to divide an inner hole of the inner fixed sleeve into a first inner hole section and a second inner hole section. The first inner hole section and the second inner hole section are located at two ends of the annular boss. The inner fixed sleeve has a steel ball groove running through the inner and outer walls of the inner fixed sleeve. The steel ball is located in the steel ball groove. The outer movable sleeve is sleeved on an outer periphery of the inner fixed sleeve. The first spring is configured for providing the outer movable sleeve with a return elastic force for axial displacement. The fixed mandrel and the annular movable plug are located in the inner fixed sleeve. One end of the annular movable plug has a socket. The annular movable plug is sleeved on an outer periphery of the fixed mandrel and is slidable axially. An outer surface of the annular movable plug includes a first section outer surface, a second section outer surface and a third section outer surface that are arranged sequentially in an axial direction toward the socket. A retaining ring is provided on the first section outer surface. An outer periphery of the retaining ring extends beyond the second section outer surface to form an anti-detachment portion. The anti-detachment portion is confined by one end of the annular boss. The second spring acts on the retaining ring to provide the annular movable plug with a return elastic force for axial displacement. A first restricting step is connected between the second section outer surface and the third section outer surface. The first restricting step is confined by the other end of the annular boss. An inner surface of the annular movable plug includes a first section inner surface, a second section inner surface and a third section inner surface that are arranged sequentially in the axial direction toward the socket. The first section inner surface is in sealing contact with the fixed mandrel in a slideable manner in the axial direction. A second restricting step is connected between the second section inner surface and the first section inner surface. The third section inner surface is a flared surface that is gradually enlarged toward the socket.

The male connector assembly includes a male connector, a male sleeve, a male movable plug, and a third spring. The male sleeve is inserted in one end of the male connector and communicates with the male connector. One end of the male sleeve is defined as a connecting end. The male movable plug is disposed inside the connecting end of the male sleeve. The male movable plug is in sealing contact with the male sleeve in a slideable manner in the axial direction. The third spring is configured for providing the male movable sleeve with a return elastic force for axial displacement. An outer periphery of the male sleeve has a locking groove for receiving the steel ball. An inner side of the locking groove, facing the connecting end, having a locking bevel or locking curved surface.

DETAILED DESCRIPTION OF THE PREFERRED EMBODIMENTS

Embodiments of the present invention will now be described, by way of example only, with reference to the accompanying drawings.

Figure 1:
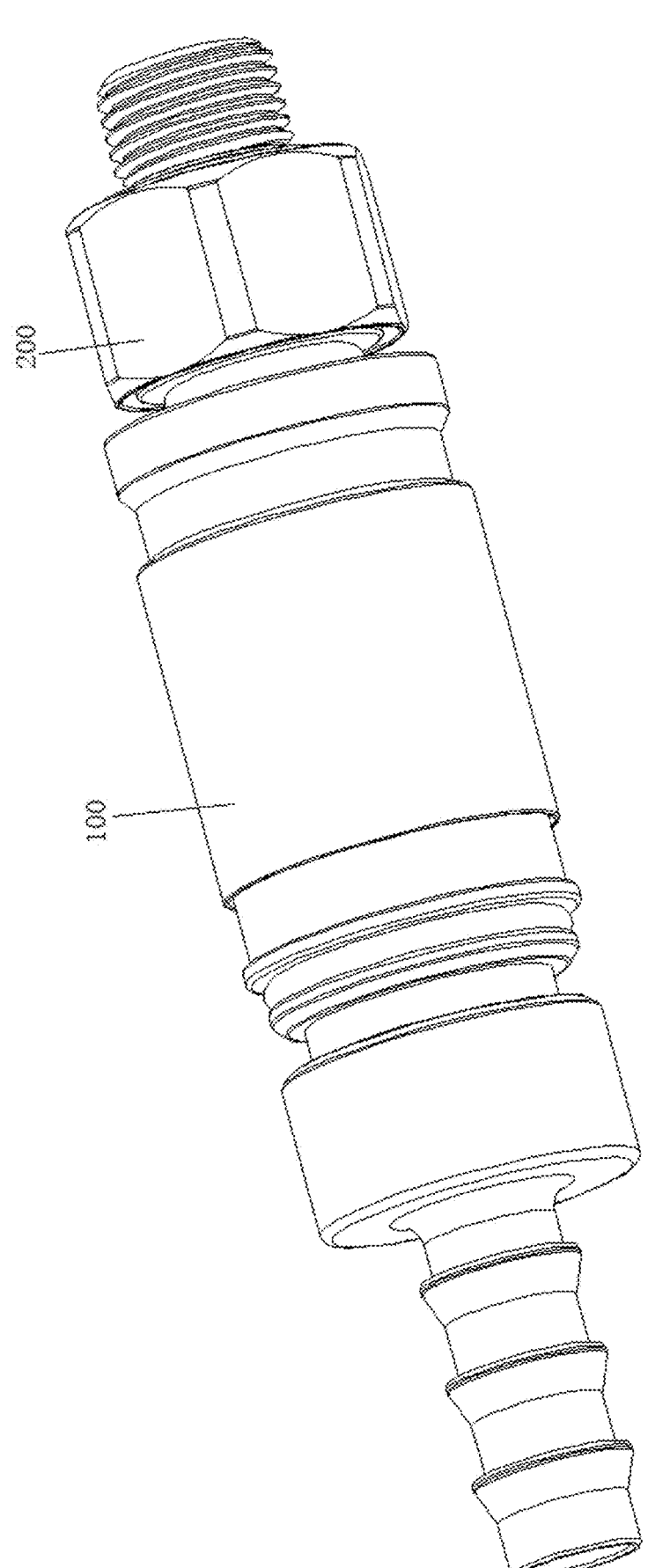
FIG. 1 is a perspective view of the female connector assembly and the male connector assembly of the quick connector structure according to an embodiment of the present invention.
Figure 2:
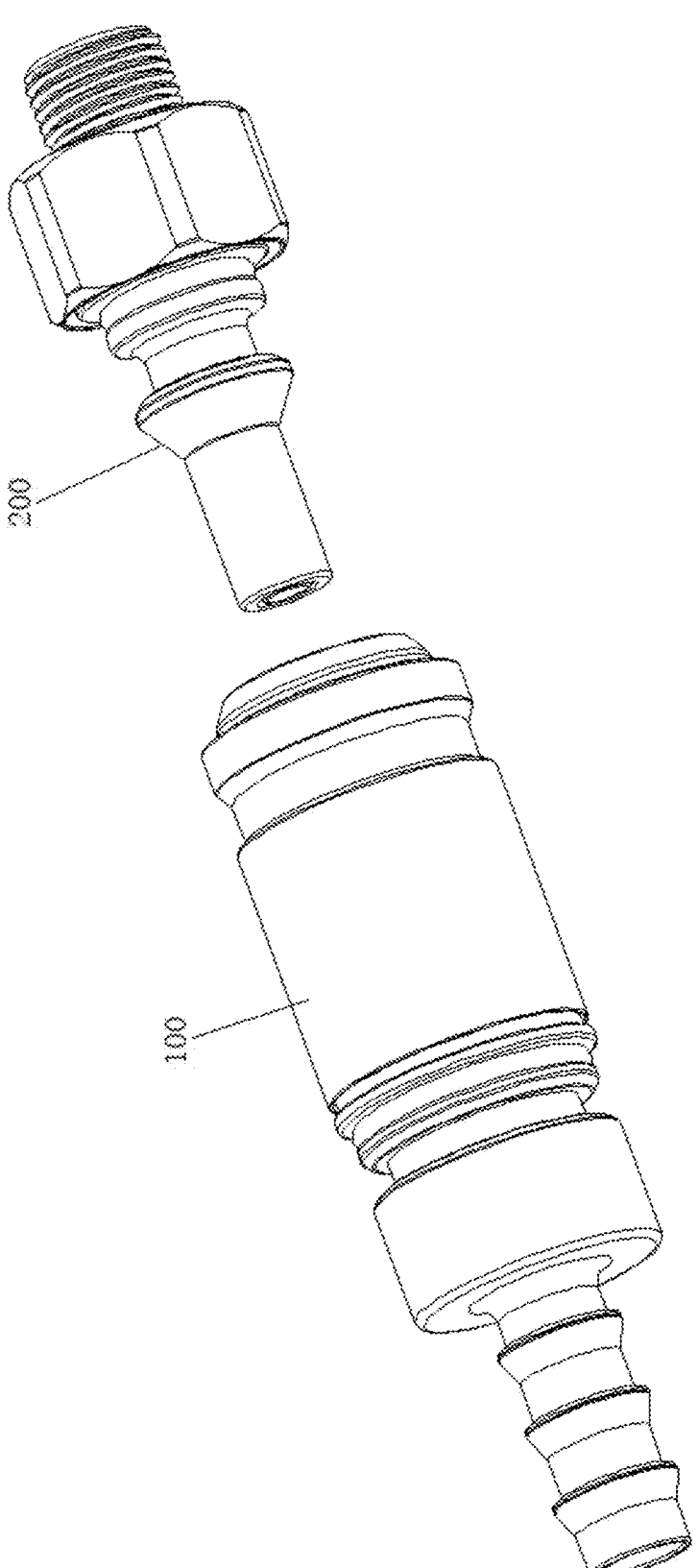
FIG. 2 is an exploded view of the female connector assembly and the male connector assembly of the quick connector structure according to the embodiment of the present invention.
Figure 3:
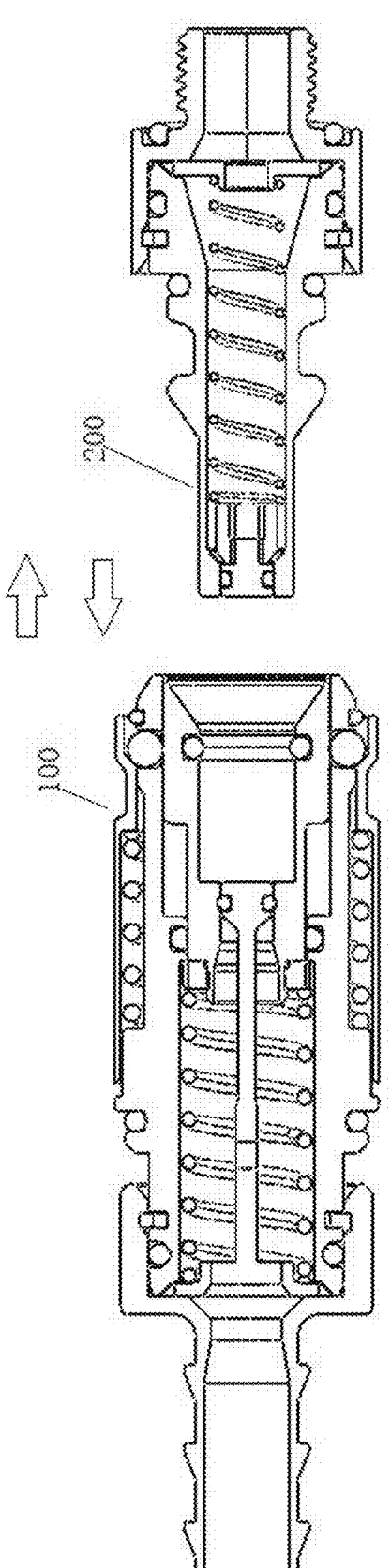
FIG. 3 is a cross-sectional view of the female connector assembly and the male connector assembly of the quick connector structure according to the embodiment of the present invention.
Figure 3:
Figure 4:
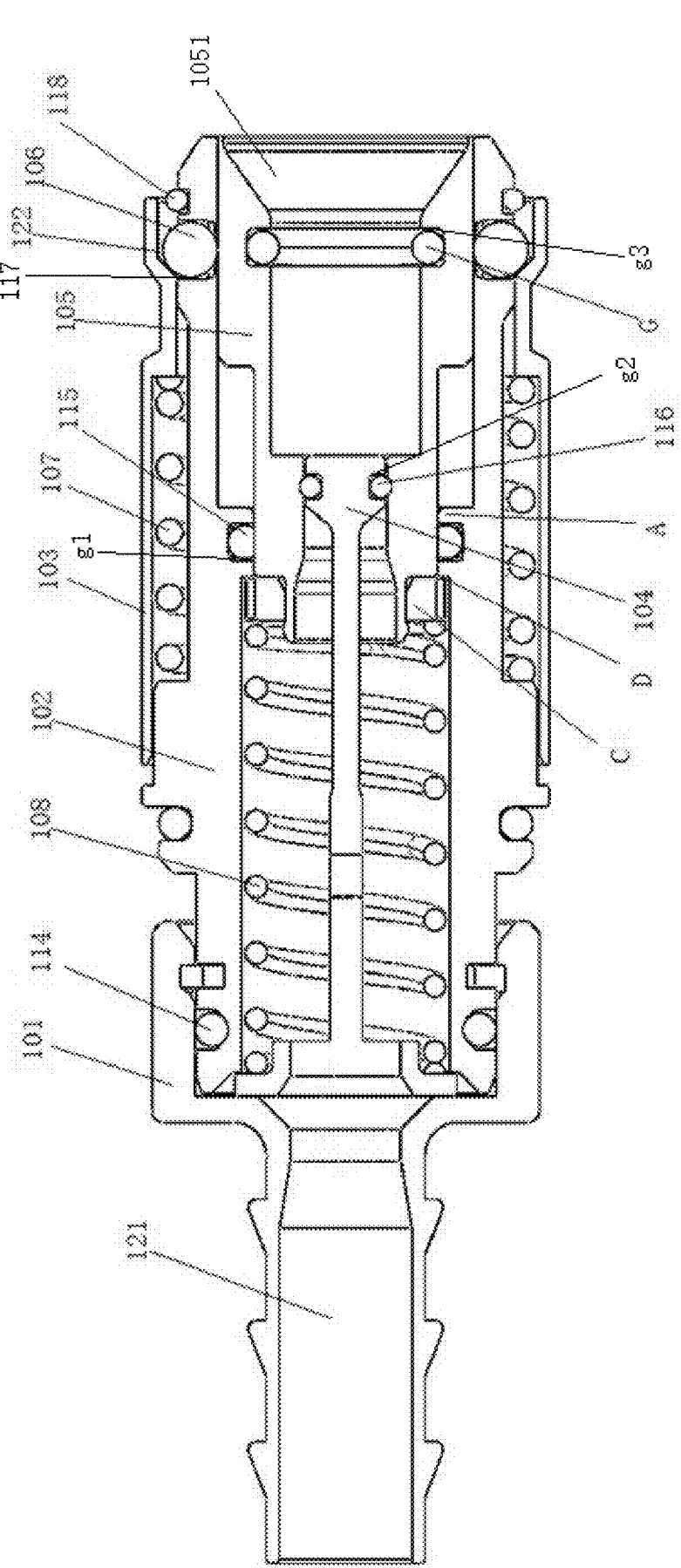
FIG. 4 is a cross-sectional view of the female connector assembly of the quick connector structure according to the embodiment of the present invention.
Figure 5:
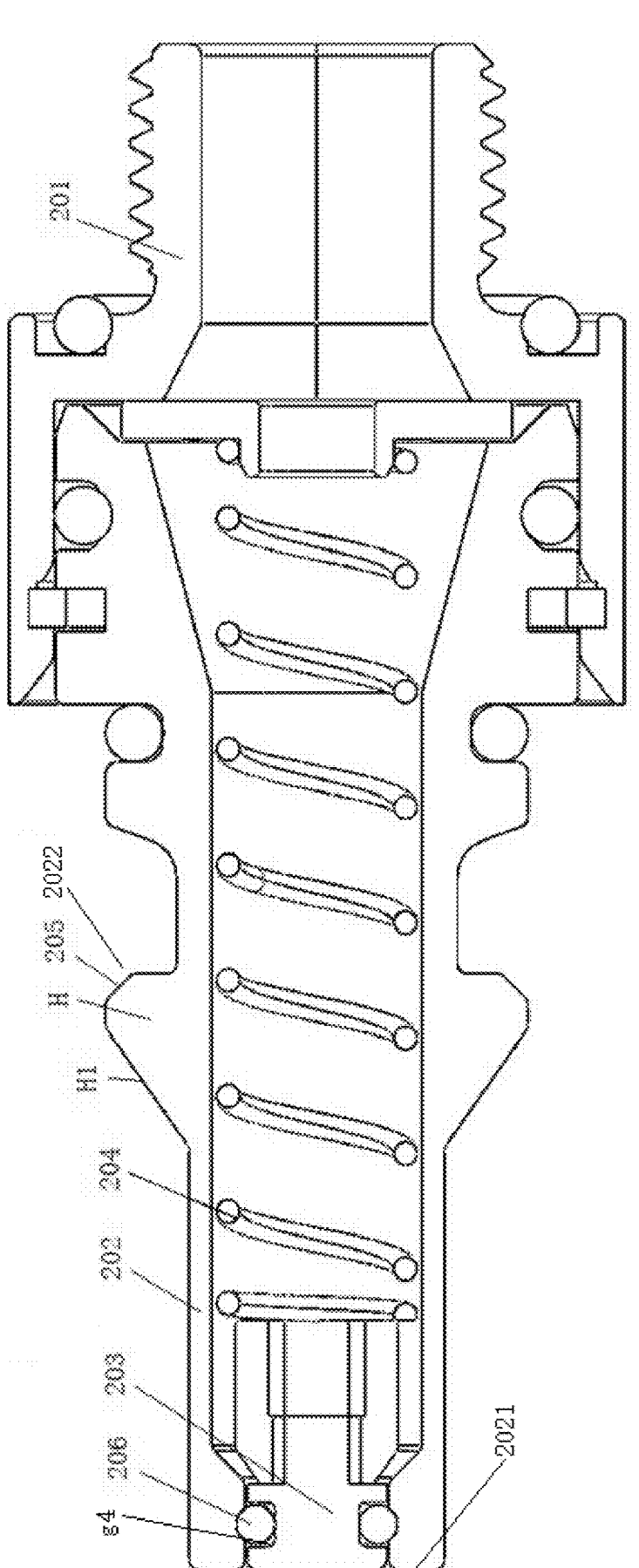
FIG. 5 is a cross-sectional view of the male connector assembly of the quick connector structure according to the embodiment of the present invention.
Figure 6:
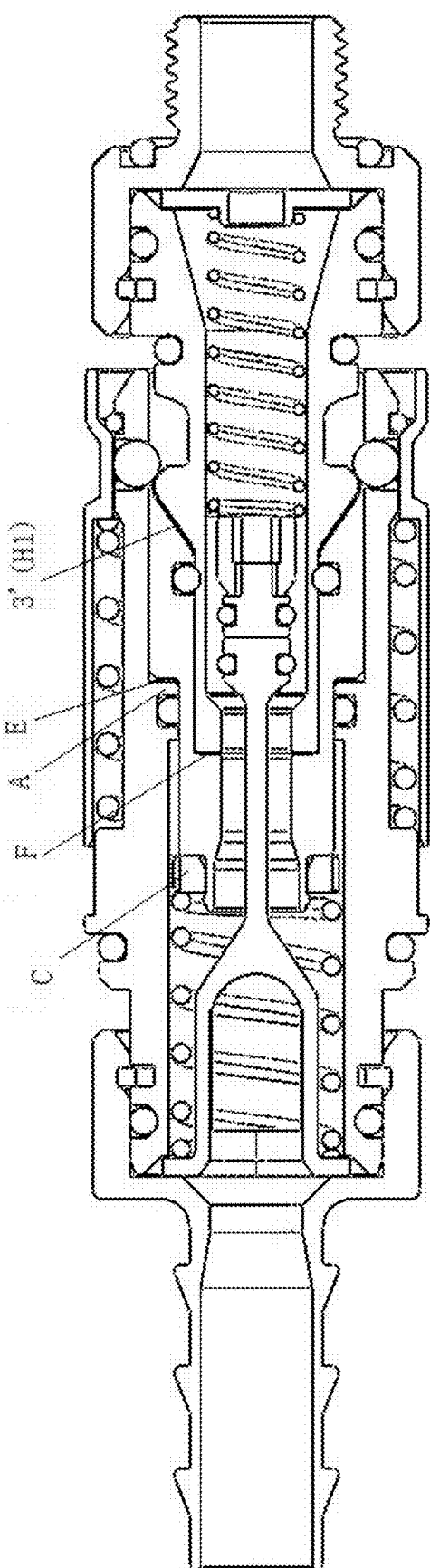
FIG. 6 is a cross-sectional view showing the combination of the female connector assembly and the male connector assembly of the quick connector structure according to the embodiment of the present invention.
Figure 7:
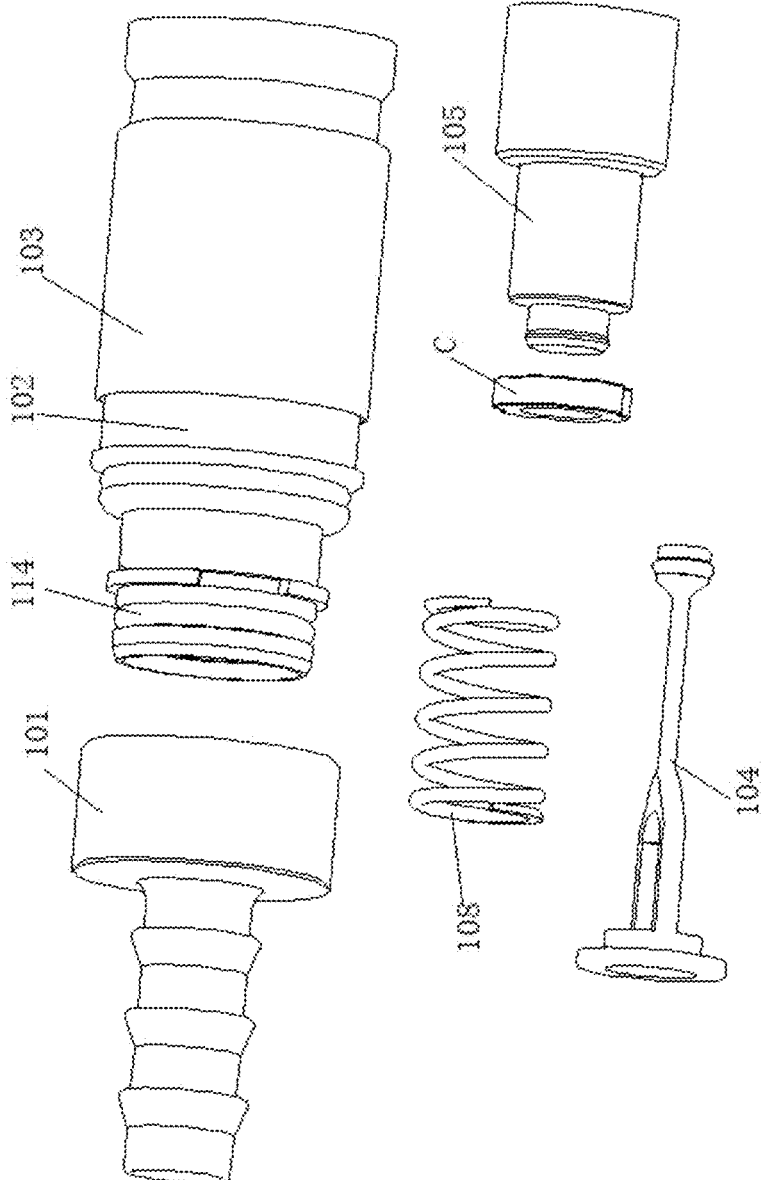
FIG. 7 is an exploded view of the female connector assembly of the quick connector structure according to the embodiment of the present invention.
Figure 8:
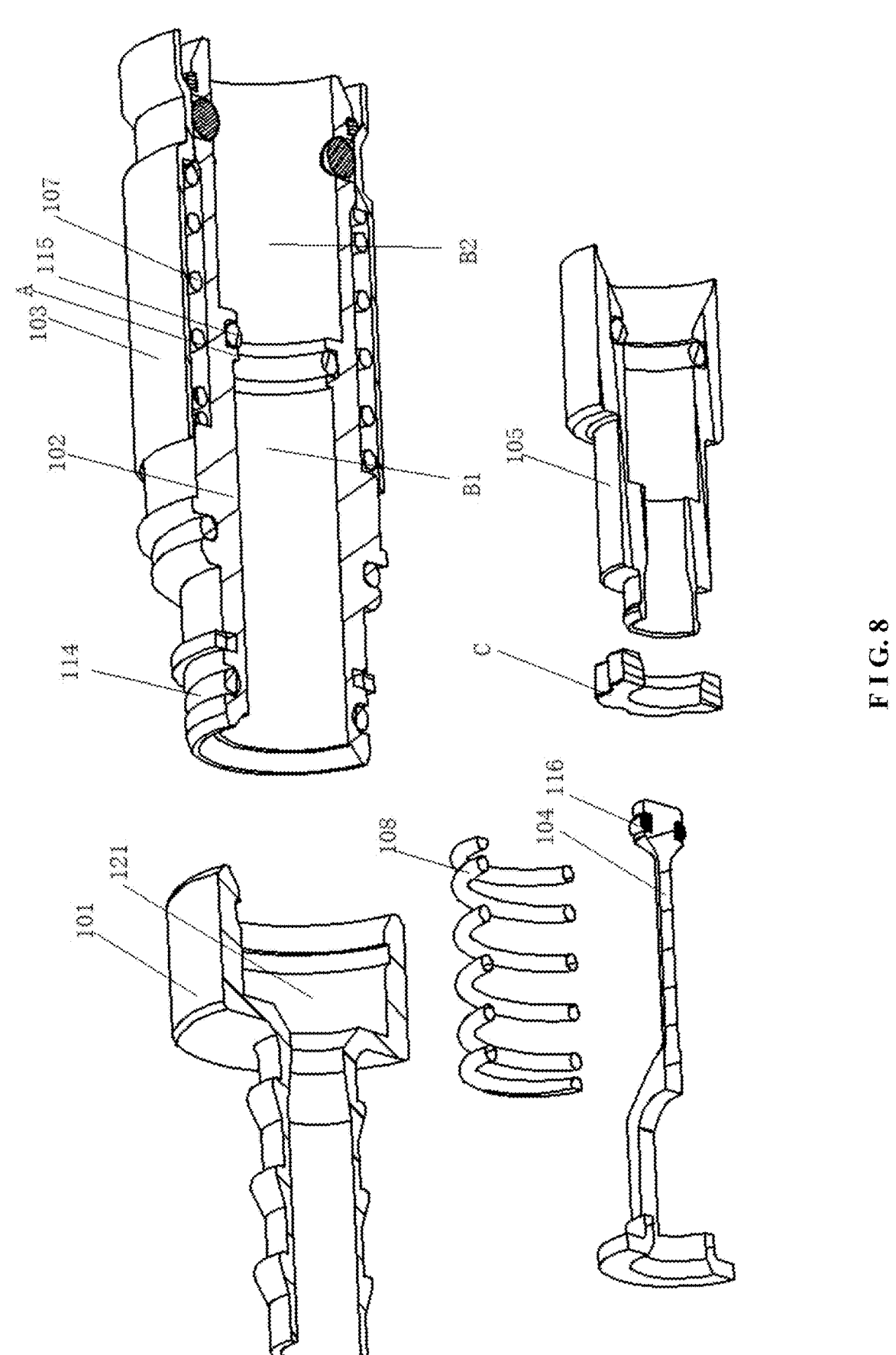
FIG. 8 is an exploded and sectional view of the female connector assembly of the quick connector structure according to the embodiment of the present invention.
Figure 9:
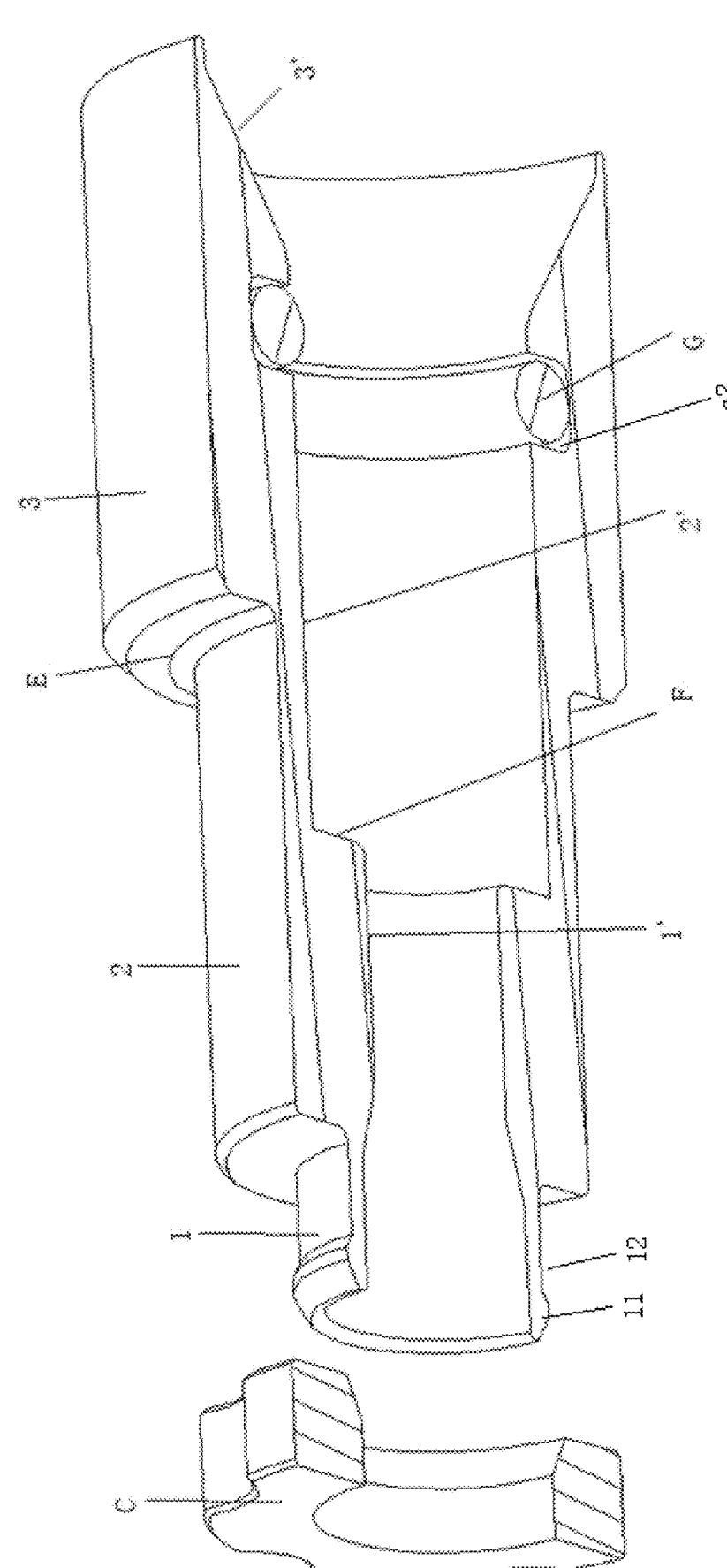
FIG. 9 is an exploded and sectional view of the annular movable plug and the retaining ring according to the embodiment of the present invention.
Figure 10:
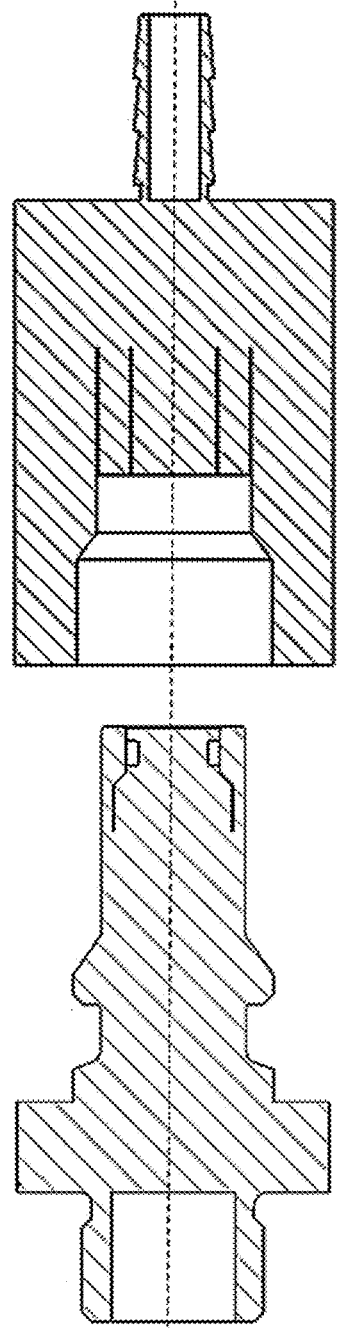
FIG. 10 an exploded and sectional view of a conventional quick connector structure according to the specification of universal quick disconnect (UQD), Revision 1.0.

Referring to FIGS. 1 to 9, a quick connector structure comprises a female connector assembly 100 and a male connector assembly 200 that are detachably connected to each other.

The female connector assembly 100 includes a female connector 101, an inner fixed sleeve 102, an outer movable sleeve 103, a fixed mandrel 104, an annular movable plug 105, a steel ball 106, a first spring 107, and a second spring 108. The female connector 101 has a first accommodation chamber 121 therein. The first accommodation chamber 121 runs through both ends of the female connector 101. The fixed mandrel 104 is disposed inside the female connector 101. The fixed mandrel 104 has a closed head portion, an internal communication chamber, and a lateral through hole. The inner end of the internal communication chamber communicates with the inner end of the first accommodation chamber 121. The lateral through hole is located at the inner side of the closed head portion and communicates with the internal communication chamber and the first accommodation chamber 121. A first sealing ring 114 is provided between the inner fixed sleeve 102 and the inner wall of the female connector 101. The inner fixed sleeve 102 extends into one end of the female connector 101. The inner wall of the inner fixed sleeve 102 has an annular boss A to divide the inner hole of the inner fixed sleeve 102 into a first inner hole section B1 and a second inner hole section B2. The first inner hole section B1 and the second inner hole section B2 are located at both ends of the annular boss A. The inner fixed sleeve 102 has a steel ball groove 117 running through the inner and outer walls of the inner fixed sleeve 102. The steel ball 106 is located in the steel ball groove 117. The outer movable sleeve 103 is sleeved on the outer periphery of the inner fixed sleeve 102. The first spring 107 is configured for providing the outer movable sleeve 103 with a return elastic force for axial displacement. In this embodiment, a steel ball blocking groove 122 is formed on the inner wall of the outer movable sleeve 103. In an unplugged state, the steel ball 106 is partially located in the steel ball blocking groove 122 and is confined by the inner left end face of the steel ball blocking groove 122. A circular retaining spring 118 is provided on the outer periphery of the inner fixed sleeve 102. The outer movable sleeve 103 is rotatable relative to the female connector 101 and the inner fixed sleeve 102. Both the fixed mandrel 104 and the annular movable plug 105 are located in the inner fixed sleeve 102. One end of the annular movable plug 105 has a socket 1051. The annular movable plug 105 is sleeved on the outer periphery of the fixed mandrel 104 and is slidable axially. The outer surface of the annular movable plug 105 includes a first section outer surface 1, a second section outer surface 2 and a third section outer surface 3 that are arranged sequentially in the axial direction toward the socket 1051. A retaining ring C is provided on the first section outer surface 1. Specifically, the first section outer surface 1 has a guide portion 11 and an engaging groove 12. The retaining ring C is inserted in the engaging groove 12 from the axial inner end of the annular movable plug 105. Both ends of the retaining ring C are confined by the guide portion 11 and one end of the annular boss A. The outer diameter of the retaining ring C is greater than the outer diameter of the second section outer surface 2. The outer periphery of the retaining ring C extends beyond the second section outer surface 2 to form an anti-detachment portion D. The anti-detachment portion D is confined by one end of the annular boss A. The second spring 108 acts on the retaining ring C to provide the annular movable plug 105 with a return elastic force for axial displacement. A first restricting step E is connected between the second section outer surface 2 and the third section outer surface 3. The first restricting step E is confined by the other end of the annular boss A. The inner surface of the annular movable plug 105 includes a first section inner surface 1', a second section inner surface 2' and a third section inner surface 3' that are arranged sequentially in the axial direction toward the socket 1051. The first section inner surface 1' is in sealing contact with the fixed mandrel 104 in a slideable manner in the axial direction. A second restricting step F is connected between the second section inner surface 2' and the first section inner surface 1'. The third section inner surface 3' is a flared surface that is gradually enlarged toward the socket 1051. A second sealing ring 115 is provided between the outer periphery of the annular movable plug 105 and the inner wall of the inner fixed sleeve 102. A first annular groove g1 is formed on the inner annular surface of the annular boss A. The second sealing ring 115 is located in the first annular groove g1. A second annular groove g2 is formed on the outer periphery of the fixed mandrel 104, and a third sealing ring 116 is provided in the second annular groove g2, so that the first section inner surface 1' is in sealing contact with the fixed mandrel 104. A third annular groove g3 is formed on the second section inner surface 2'. A fourth sealing ring G is provided in the third annular groove g3. The fourth sealing ring G is located close to the third section inner surface 3' and away from the first section inner surface 1'.

The male connector assembly 200 includes a male connector 201, a male sleeve 202, a male movable plug 203, and a third spring 204. The male sleeve 202 is inserted in one end of the male connector 201 and communicates with the male connector 201. One end of the male sleeve 202 is defined as a connecting end 2021. The male movable plug 203 is disposed inside the connecting end 2021 of the male sleeve 202. The male movable plug 203 is in sealing contact with the male sleeve 202 in a slideable manner in the axial direction. The third spring 204 is configured for providing the male movable sleeve 103 with a return elastic force for axial displacement. The outer periphery of the male sleeve 202 has a locking groove 2022 for receiving the steel ball. The inner side of the locking groove 2022, facing the connecting end 2021, has a locking bevel or locking curved surface 205. A fourth annular groove g4 is formed on the outer periphery of the male movable plug 203. A fifth sealing ring 206 is provided in the fourth annular groove g4, so that the male movable plug 203 is in sealing contact with the male sleeve 202. The outer periphery of the male sleeve 202 has an annular frustum H. One side of the annular frustum H, facing the connecting end 2021 of the male sleeve 202, has a tapered slope H1. The tapered slope H1 is matched and positioned with the third section inner surface 3'. The locking bevel or locking curved surface 205 is located on the other side of the annular frustum H, facing away from the connecting end 2021 of the male sleeve 202.

When the male connector assembly 200 is insertedly connected to the female connector assembly 100, the male sleeve 202 is inserted along the third section inner surface 3' and abuts against the second restricting step F, such that the annular movable plug 105 continues to be displaced inward axially. The sealing contact between the first section inner surface 1' and the fixed mandrel 104 is released. The second spring 108 is in a compressed state until the first restricting step E is confined by the other end of the annular boss A. The male movable plug 203 is against the fixed mandrel 104. The position of the fixed mandrel 104 is unchanged. The male movable plug 203 is compressed and moved inward axially. The third spring 204 is in a compressed state.

What is claimed is:

1. A quick connector structure, comprising a female connector assembly and a male connector assembly that are detachably connected to each other;

the female connector assembly including a female connector, an inner fixed sleeve, an outer movable sleeve, a fixed mandrel, an annular movable plug, a steel ball, a first spring and a second spring; the inner fixed sleeve extending into one end of the female connector, an inner wall of the inner fixed sleeve having an annular boss to divide an inner hole of the inner fixed sleeve into a first inner hole section and a second inner hole section, the first inner hole section and the second inner hole section being located at two ends of the annular boss; the inner fixed sleeve having a steel ball groove running through the inner and outer walls of the inner fixed sleeve, the steel ball being located in the steel ball groove; the outer movable sleeve being sleeved on an outer periphery of the inner fixed sleeve, the first spring being configured for providing the outer movable sleeve with a return elastic force for axial displacement; the fixed mandrel and the annular movable plug being located in the inner fixed sleeve, one end of the annular movable plug having a socket, the annular movable plug being sleeved on an outer periphery of the fixed mandrel and being slidable axially, the annular movable plug having an outer surface composed of a first section outer surface, a second section outer surface and a third section outer surface that are arranged sequentially in an axial direction toward the socket, a retaining ring being provided on the first section outer surface, an outer periphery of the retaining ring extending beyond the second section outer surface to form an anti-detachment portion, the anti-detachment portion being confined by one end of the annular boss, the second spring acting on the retaining ring to provide the annular movable plug with a return elastic force for axial displacement, a first restricting step being connected between the second section outer surface and the third section outer surface, the first restricting step being confined by another end of the annular boss; the annular movable plug having an inner surface composed of a first section inner surface, a second section inner surface and a third section inner surface that are arranged sequentially in the axial direction toward the socket, the first section inner surface being in sealing contact with the fixed mandrel in a slideable manner in the axial direction, a second restricting step being connected between the second section inner surface and the first section inner surface, the third section inner surface being a flared surface that is gradually enlarged toward the socket;

the male connector assembly including a male connector, a male sleeve, a male movable plug and a third spring, the male sleeve being inserted in one end of the male connector and communicating with the male connector, one end of the male sleeve being defined as a connecting end, the male movable plug being disposed inside the connecting end of the male sleeve, the male movable plug being in sealing contact with the male sleeve in a slideable manner in the axial direction, the third spring being configured for providing the male movable sleeve with a return elastic force for axial displacement, an outer periphery of the male sleeve having a locking groove for receiving the steel ball, an inner side of the locking groove, facing the connecting end, having a locking bevel or locking curved surface.

2. The quick connector structure as claimed in claim 1, wherein a second sealing ring is provided between an outer periphery of the annular movable plug and the inner wall of the inner fixed sleeve.

3. The quick connector structure as claimed in claim 1, wherein a second annular groove is formed on the outer periphery of the fixed mandrel, and a third sealing ring is provided in the second annular groove, so that the first section inner surface is in sealing contact with the fixed mandrel.

4. The quick connector structure as claimed in claim 1, wherein the first section outer surface has a guide portion and an engaging groove, and the retaining ring is inserted in the engaging groove from an axial inner end of the annular movable plug.

5. The quick connector structure as claimed in claim 1, wherein a fourth annular groove is formed on the outer periphery of the male movable plug, and a fifth sealing ring is provided in the fourth annular groove, so that the male movable plug is in sealing contact with the male sleeve.

6. The quick connector structure as claimed in claim 1, wherein the outer periphery of the male sleeve has an annular frustum, one side of the annular frustum, facing the connecting end of the male sleeve, has a tapered slope, the tapered slope is matched and positioned with the third section inner surface, the locking bevel or locking curved surface is located on another side of the annular frustum, facing away from the connecting end of the male sleeve.

7. The quick connector structure as claimed in claim 1, wherein a steel ball blocking groove is formed on an inner wall of the outer movable sleeve, when in an unplugged state, the steel ball is partially located in the steel ball blocking groove and is confined by an inner left end face of the steel ball blocking groove; a retaining spring is provided on the outer periphery of the inner fixed sleeve; the outer movable sleeve is rotatable relative to the female connector and the inner fixed sleeve.

8. The quick connector structure as claimed in claim 1, wherein a third annular groove is formed on the second section inner surface, and a fourth sealing ring is provided in the third annular groove.

9. The quick connector structure as claimed in claim 8, wherein the fourth sealing ring is located close to the third section inner surface and away from the first section inner surface.

\* \* \* \* \*